1818X
W. EDWARDS.
TANNING.
Patented Oct. 19, 1812.
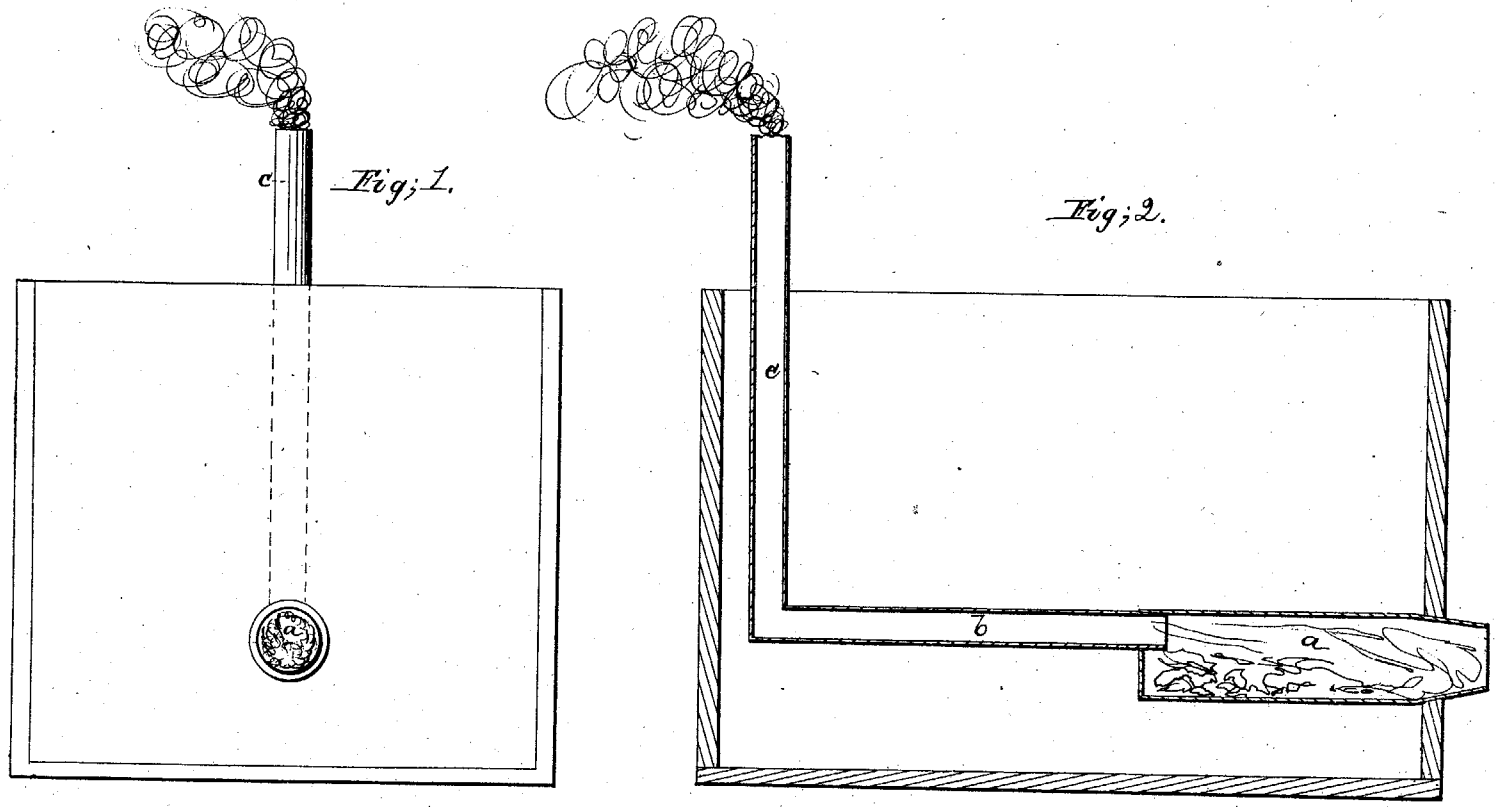
THE NORRIS PETERS CO., PHOTO-LITHO., WASHINGTON, D. C.

1818

William Edwards Letters Patent Dated Oct 9. 1818.

The Schedule referred to in these Letters Patent, and making part of the same, containing a description in the words of the said William Edwards himself, of his improvement in tanning.

This Invention consists of a cylindrical heater made of bop-per, brass, tin, Iron or composition of metal, this should be round, contracted at the mouth in order conveniently to insert it in the end of a vat or seech, from its mouth for three feet it should be fejteen inches in diameter in order to receive the fuel, at three feet from its mouth it should be contracted to the size of a common stove pipe, which should be extended the length of the vat which is to receive it, a right angle to be then formed and the pipe extended above the top of the vat, when the vat is filled with bark or tan and with water by making a fire in the large part of the heater, heat will be produced in the vat which is of much use in the process of tanning by extract-ing all the tannin contained in the bark & lessening the time neces-sary to completely saturate the hide with the tanning princi-ple contained in the bark In presence of us
Daniel Stebbins
J. Stoddard Jr Signed William Edwards

W.K (Received and Recorded anew April 3d 1843)

Drawing made [illegible]